Aug. 28, 1962

R. W. CASHMAN ETAL 3,051,029

TOOL SUPPORTING APPARATUS

Filed Jan. 11, 1960

INVENTORS.
Robert W. Cashman
BY Anthony Wasco, Jr.

ATTORNEYS

Aug. 28, 1962  R. W. CASHMAN ETAL  3,051,029
TOOL SUPPORTING APPARATUS
Filed Jan. 11, 1960  3 Sheets-Sheet 3
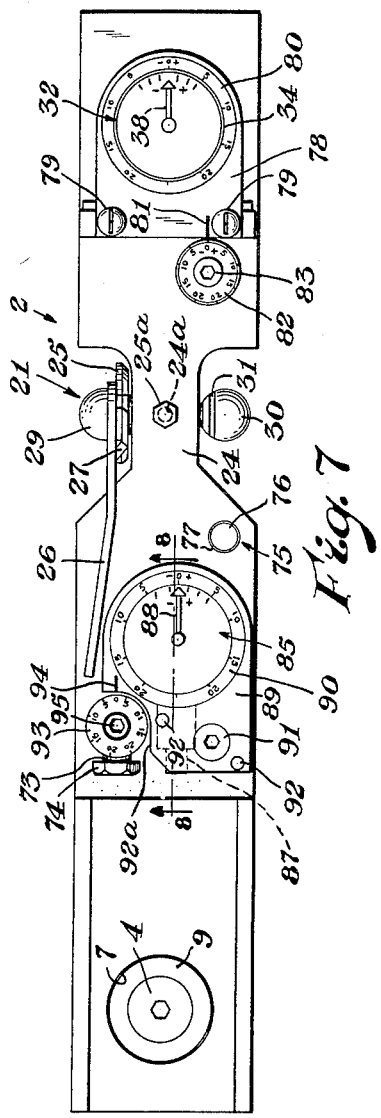
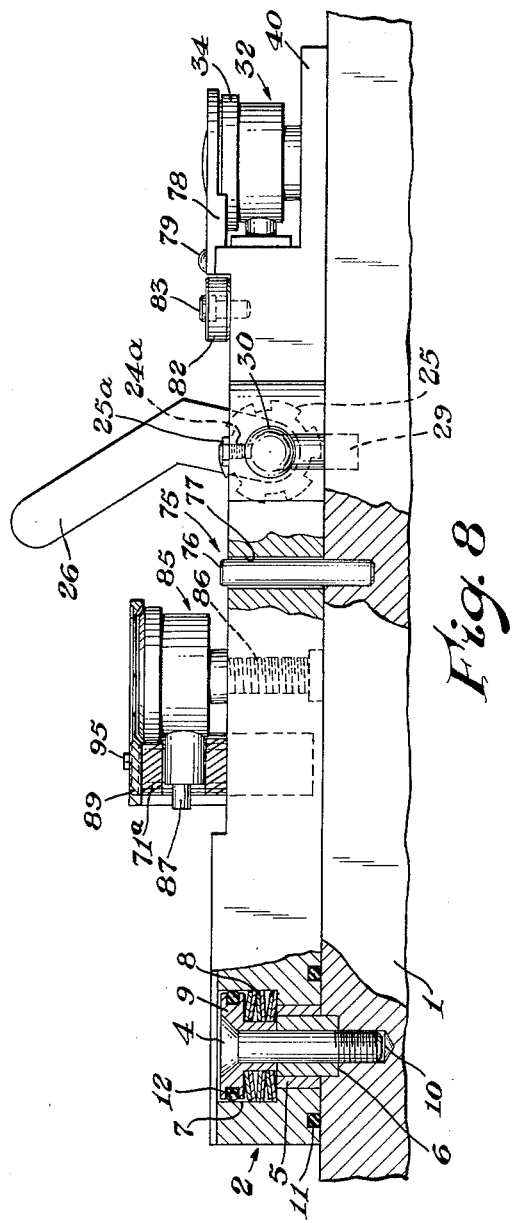
INVENTORS.
Robert W. Cashman
BY Anthony Wasco, Jr.
ATTORNEYS

United States Patent Office 3,051,029
Patented Aug. 28, 1962

3,051,029
TOOL SUPPORTING APPARATUS
Robert W. Cashman and Anthony Wasco, Jr., Saginaw, Mich., assignors to Saginaw Machine and Tool Company, Saginaw, Mich.
Filed Jan. 11, 1960, Ser. No. 1,772
8 Claims. (Cl. 82—36)

This invention relates to tool supporting apparatus and more particularly to adjustable apparatus of the kind especially adapted for use in holding and presenting a tool to a workpiece that is to be precision bored, turned, or otherwise machined.

In precision machining operations great care must be exercised in orienting a cutting tool to a workpiece. Especially is this true with automated machinery, for unless the tool is accurately located relatively to a workpiece support, a great deal of spoilage may occur. The orienting of the tool relatively to the workpiece is a continuing process which takes place not only upon the setting up of a machine for a production run, but also intermittently during the course of the run inasmuch as the tool must be adjusted relatively to the workpiece in order to compensate for wear of the tool and other parts.

Various kinds of tool holders and supporting apparatus have been proposed heretofore, but such devices have not been altogether satisfactory, for a number of reasons. One difficulty with known tool supporting devices is the lack of accurate indicating means for showing precisely the amount of adjustment imparted to a tool relative to a workpiece. Other devices having adjustment indicating means of a most precise kind may be rendered completely unreliable should adjusting mechanism itself be any less than the indicating means. A typical adjusting mechanism may comprise a pair of threaded members mounted one within another for relative rotation in two opposite directions. Backlash between the threads is taken up when the screw is turned in one direction only, but when turned in the opposite direction the backlash can produce an error in the indicating device. In other words, some tool supports have indicating means which function satisfactorily as long as the adjustment of a tool proceeds in one direction only, but when it becomes necessary to reverse or otherwise change the direction of adjustment of the tool, the indicating means is rendered unreliable. The principal reason for the unreliability of such devices lies in the inability of the indicating apparatus to compensate for any backlash or the like which may exist in the tool adjusting mechanism. So far as is known, no multi-directional adjusting mechanism exists which does not have at least some backlash or equivalent inherent defect. In precision work, even the smallest amount of backlash which is not corrected or compensated for can result in spoilage.

An object of this invention is to provide tool supporting apparatus which overcomes the difficulties of known tool supporting devices.

Another object of the invention is to provide tool supporting apparatus having means for adjusting a tool relatively to a workpiece and in which any backlash or the like in the adjusting mechanism is compensated for completely.

Another object of the invention is to provide tool supporting apparatus of the kind described which includes precision indicating means operable only upon actual movement of a tool relatively to a workpiece during adjustment of the apparatus.

A further object of the invention is to provide tool supporting apparatus of the kind referred to wherein the effective amount of tool adjustment may be read directly from the indicating means.

Another object of the invention is to provide tool supporting apparatus which is capable of use either as a left hand or a right hand tool support.

Other objects and advantages of the invention will be pointed out specifically or will become apparent from the following description when it is considered in conjunction with the appended claims and the accompanying drawings, in which:

FIGURE 7 is a view similar to FIGURE 1, but showing certain accessories added to the structure of FIGURE 1; and FIGURE 8 is a sectional view taken on the line 8—8 of FIGURE 7.

Figure 2:
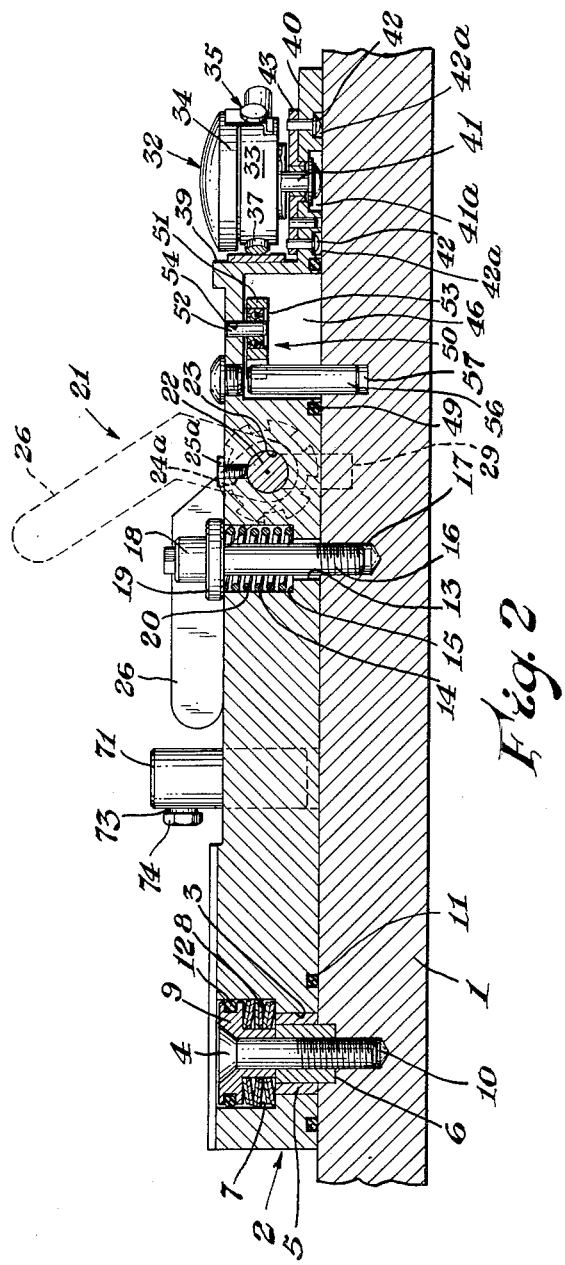
FIGURE 2 is a longitudinal, sectional view taken on the line 2—2 of FIGURE 1.

Apparatus formed in accordance with the invention is adapted for use in conjunction with a machine tool such as a facing, boring, turning, or other machine having a base, bed, or other support structure 1. Associated with the base 1 is a tool supporting and adjusting member 2 having a bore 3 adjacent to one end of such size as to accommodate a conically headed screw 4 and bearing parts 5 and 6. The bore 3 communicates with a counterbore 7 in which is received a suitable number of spring washers 8 and a retaining device 9 by means of which the spring washers are maintained under pressure. The machine base 1 is provided with a threaded opening 10 which receives the threaded end of the screw 4 and, as is best illustrated in FIGURE 2, the opening 10 is enlarged to receive a portion of the bearing 6. The arrangement of the parts described thus far is that the support member 2 is pivotally mounted on the base 1 for swinging movements parallel to the plane of the base about the axis of the pivot screw 4. O-rings 11 and 12 may be provided as shown so as to seal the pivot against the entry of foreign matter.

At a point intermediate the ends of the support 2, the latter is bored as at 13 and counterbored as at 14 to provide a shoulder 15. Extending through the bore and counterbore is a threaded screw 16 which is received in a threaded opening 17 tapped in the base member 1. The screw 16 is provided with a head 18 and an enlarged flange 19 which is of such size as to overlie completely the counterbore 14. Interposed between the collar 19 and the shoulder 15, and located within the counterbore 14, is a compression spring 20. The purpose of the spring 20 is to exert a thrust against the shoulder 15 of such magnitude as to exert a constant force on the support arm 2 and maintain the entire lower surface on the latter flush against the surface of the base 1, but permitting swinging movement of the arm 2 over the surface of the base. The screw 16, however, can be used to lock the arm 2 against movement relative to the base.

As is illustrated in FIGURE 2, the diameter of the bore 13 is substantially larger than the diameter of the shank of the screw 16. Because of the larger diameter of the bore 13, the arm 2 will be capable of swinging movement about the axis of the pivot 4 relative to the screw 16, and the amount of such relative movement of the parts 2 and 17 will depend upon the differences in diameters of the parts 16 and 13.

Figure 6:
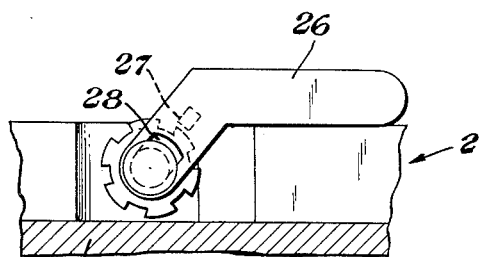
FIGURE 6 is a side elevational view illustrating a detail of the apparatus.

Adjusting means 21 is provided for effecting movement of the arm 2 relative to the base 1 about the axis of the pivot 4 and comprises a threaded shaft 22 extending completely through a correspondingly threaded opening 23 lying transversely of the arm 2 and being located at a reduced neck portion 24 of the arm. The neck portion is provided to permit all parts of the adjusting mechanism to be wholly within the confines of the overall dimensions of the arm 2. One end of the shaft 22 is keyed or otherwise suitably fixed to a toothed wheel 25 and at the same end of the shaft is rotatably mounted a manually manipulatable adjusting crank or lever 26 having a laterally projecting tang or pawl 27 which is adapted to enter the space between any two adjacent teeth of the wheel 25 so as to rotate the latter and, consequently, the threaded shaft 22. The lever 26 is provided with an elongated slot 28 (see FIGURE 6) which receives the shaft 22, the arrangement being such as to permit the lever 26 to be adjusted relatively to the shaft 22 an amount sufficient to permit the pawl 27 to be moved from one tooth interspace to another in a manner akin to a ratchet mechanism.

The same end of the threaded shaft 22 on which the lever 26 is mounted abuts a post 29 that is anchored in the base member 1. The opposite end of the shaft 22 abuts a similar post 30 that also is anchored in the machine bed 1. The construction and arrangement of the adjusting mechanism is such that the shaft 22 is rotatable relatively to the arm 2, but is restrained by the posts 29 and 30 against lengthwise movement. Since the shaft 22 cannot move longitudinally, rotation of the shaft will effect a reaction between the shaft and the posts 29 and 30 so as to cause movement of the arm 2 about the axis of the pivot post 4 relative to the base 1. If desired, the post 30 may be provided with a vertical slot adapted to receive a wedge shaped shim 31 that may be adjusted from time to time so as to compensate for any wear caused by the rotation of the shaft 22 relative to the posts 29 and 30.

Preferably, the neck area 24 is provided with an opening 24a through which lubricant can be introduced to the parts 22 and 23, and the opening may be sealed normally by a threaded plug 25a.

Means operable to indicate the amount of relative movement between the arm 2 and the base 1 is provided and comprises a dial indicator 32 of known construction and including a body member 33 on which is rotatably mounted an adjustable bezel 34 that is capable of being clamped in any position of adjustment relative to the body 33 by means of a lock mechanism 35. Mounted for adjustment with the bezel 34 is a dial plate 36 having a zero marking and a progressing scale on either side of the zero marking. The scale on one side of the zero marking is labeled "—" and the scale on the opposite side of the zero marking is labeled "+."

Mounted in the body 33 is a plunger guide 37 in which is housed a spring controlled, reciprocating plunger 37a. The plunger is connected in a known manner to an indicating pointer or needle 38 whereby movement of the plunger in one direction causes rotation of the needle 38 in one direction of rotation and movement of the plunger in the opposite direction causes opposite rotation of the needle.

The end of the arm 2 remote from the pivot 4 is stepped to provide a vertical rear wall 39 and a mounting surface 40 at a somewhat lower level than the upper surface of the arm 2. The indicator 32 is mounted on the mounting surface 40 by means of a center screw 41 threaded into the body of the indicator and by retaining screws 42 threaded into an anchor plate 43 having threaded openings located to correspond to the spacing of the screws 42. As will be apparent from FIGURE 2, the heads of the screws 41 and 42 are received in recesses 41a, 42a, respectively, so as to permit the lower surface of the mounting flange 40 to lie flush against the base 1. When the indicator 32 is mounted on the arm 2 in the manner described, and the assembly is mounted on the base 1, it will not be possible to remove the indicator 32 without dismounting the arm 2 from the base. Accordingly, the possibility of loss of indicators through theft is minimized.

The wall 39 of the arm 2 is provided with a pair of forwardly diverging openings or passages 44 and 45, both of which communicate with a chamber 46 formed in the arm 2. The arrangement is such that the plunger guide 37 of the indicator 32 may be aligned with either of the passages 44 or 45 and have its plunger 37a extend into the chamber 46. In order to prevent the entry of dirt to the chamber 46 through the passage not occupied by the plunger guide 37, a cover plate 47 may be secured to the rear wall 39 by suitable means such as screws 48, the plate 47 having an opening adapted to be aligned with either of the passages 44 or 45 so as to accommodate the plunger guide 37 in either position of the indicator 32. The chamber 46 also may be surrounded by an O-ring 49, if desired.

Apparatus constructed in accordance with the invention includes an actuator or crank device 50 operable to actuate the plunger 37a of the indicator in response to relative movement of the arm 2 and the base 1 about the axis of the pivot 4. The actuator means comprises a plate 51 mounted on a post 52 by means of a press fitted bearing assembly 53, the post 52 in turn being press fitted into an opening 54 formed in the top wall of the housing 46. The plate 51 is rotatable about the axis of the post 52 and includes a laterally offset crank or lever arm 55 against which the indicator plunger 37a is adapted to seat. Rotation of the plate 51 about the axis of the post 52 will cause the plunger 37a to be either retracted into its guide 37 or extended therefrom so as to effect movement of the indicator needle 38.

Figure 4:
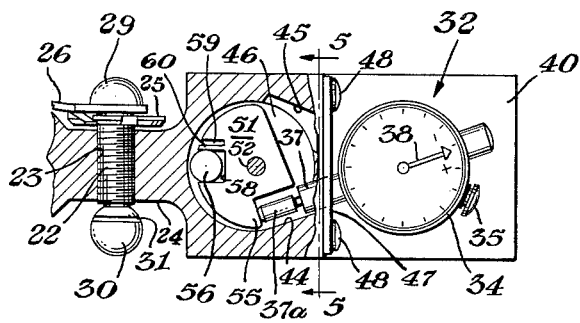
FIGURE 4 is a fragmentary view, partly in plan and partly in section, of the opposite end of the apparatus.
Figure 3:
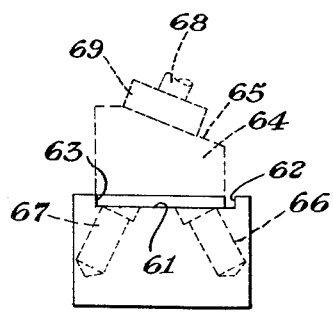
FIGURE 3 is an elevational view of one end of the apparatus.
Figure 5:
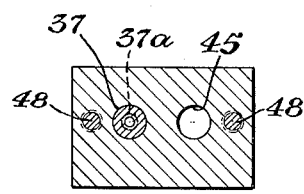
FIGURE 5 is a sectional view taken on the line 5—5 of FIGURE 4.

The actuating means includes an operating or motion transmitting post 56 securely anchored in an opening 57 formed in the bed 1 and interconnecting the latter with the actuating plate 51 so as to impart movement to the latter during relative movement of the arm 2 and the base 1. As is best shown in FIGURE 4, the post 56 is located within the housing 46 and is received in a slot 58 formed in the plate 51. In order to assure a snug fitting of the post 56 in the slot 58, the lateral dimension of the slot is slightly less than the diameter of the post. The oversize of the post is compensated for, however, by slitting the plate 51 as at 59 to form a spring finger 60 which may be deflected by the post 56 and yet serve to keep the post firmly in engagement at all times with opposite sides of the slot 58.

The supporting member or arm 2 is adapted to support a tool and the forward end of the arm 2 is provided with a recess or slideway 61 having parallel guide rails 62 and 63. Adapted to be mounted in the slideway 61 is a tool holder 64 having a width slightly less than the width of the slideway and having an inclined upper surface 65. The forward end of the tool arm 2 is provided with two sets of threaded openings 66 and 67 which diverge downwardly and each set of openings 66 and 67 is adapted to receive a pair of anchoring bolts 68 extending through slots formed in the tool holder 64 so as to clamp the latter in the slideway 61. Due to the angular disposition of the sets of openings 66, 67 and the inclined surface 65 of the tool holder, it is possible to locate the tool holder 64 tightly against one of the guide rails 62 or 63 by turning down the bolts 68 so that their heads bear against a clamp member 69. The tool holder 64 is adapted to mount a cutting tool 70 at its forward end in a position to engage a workpiece (not shown).

It is preferred that an adjustment of the tool arm 2 relatively to the base 1 be so correlated to the tool 70 and the indicator 32 as to permit the latter to read directly the effective movement of the tool 70. This may be accomplished by providing a definite relation between the distance from the cutting surface of the tool to the axis of the pivot 4 and the distance from the axis of the pivot 4 to the axis of this pin 56 which causes rotation of the actuating plate 51. These distances are represented in the drawing by the letters $x$ and $y$, respectively. The significance of this relationship of distances can best be illustrated if it is assumed, for example, that the cutting tool 70 is a boring tool and is adapted to be used in enlarging the diameter of a hole formed in a workpiece. Under such conditions, adjustment of the tool arm 2 in a direction to cause the tool 70 to move in a feed direction of .001 inch will result in .002 inch material being removed from the bore of the workpiece or, stated differently, adjustment of the tool in the described manner will cause the bore diameter to be enlarged twice the amount of the tool movement. This relationship can be indicated directly by the indicator means 32 if the distance $y$ is exactly twice the distance $x$. Under such conditions, adjustment of the arm 2 counterclockwise, as viewed in FIGURE 1, about the axis of the pivot 4 an amount sufficient to move the indicator pointer 38 from its zero position to a +.002 will result in movement of the tool 70 in a counterclockwise direction a distance of .001 inch. However, the net effect of such movement will be to cause the tool 70 to remove .002 inch from the bore of the workpiece. Hence, the indicator 32 provides a direct reading of the effective adjustment of the tool. It will be understood that the foregoing relationship of the distances $x$ and $y$ requires that an equal radius exist from the axis of the spindle 52 to the axis of the post 56 and to the point of engagement of the parts 37a and 55.

Figure 1:
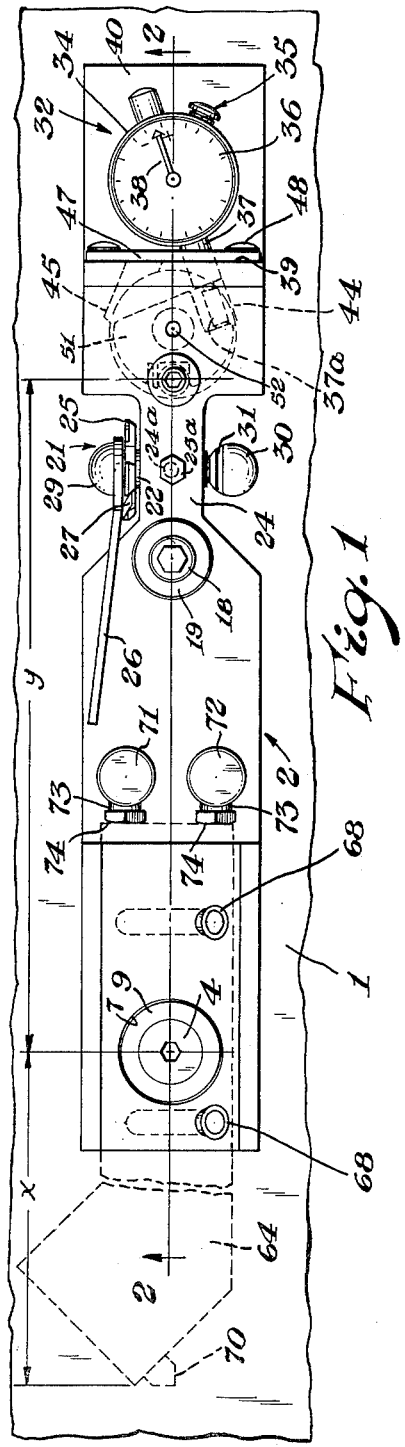
FIGURE 1 is a top plan view of tool supporting apparatus constructed in accordance with the invention, a tool holder and tool being shown in phantom lines.

In order to maintain the distances $x$ and $y$ in the desired relation, it is necessary that means be provided to adjust the tool holder 64 longitudinally of the tool arm 2 so as to compensate for wear of the tool 70 and other parts. One form of suitable adjusting means is indicated in FIGURES 1 and 2 as comprising a pair of anchor blocks 71 and 72 securely fixed to the tool arm 2 and each being equipped with adjusting screws 73 having heads 74 adapted to bear against the rear edge of the tool holder so as to be capable of shifting the latter longitudinally of the arm 2.

Whenever it becomes necessary to adjust the tool arm 2 relatively to the base 1, the operating lever 26 is manipulated so as to effect rotation in one direction or the other of the adjusting screw 22. Rotation of the screw 22 will, as has been pointed out, cause the arm 2 to swing about the axis of the pivot 4. As the arm 2 swings about the pivot axis, the actuating plate 51 is carried with the arm. Due to the engagement between the plate 51 and the anchor post 56, however, rotation is imparted to the plate 51 during relative movement of the arm 2 and the base 1. As a result of the rotation of the plate 51, the plunger 37a of the indicator 32 is caused to move, thereby effecting movement of the indicator pointer 38.

As long as the adjusting mechanism 21 is manipulated in a manner such as to cause the arm 2 to swing about the axis of the pivot 4 in one direction, say, clockwise, there will be no backlash among the relatively movable parts of the apparatus. Should the direction of manipulation of the adjusting means 21 be reversed, however, there then will be some backlash between the threads of the screw 22 and the threads of the bore 23. Such backlash apparently will occur irrespective of the care exercised in threading the parts 22 and 23 and becomes greater as the threads of such parts wear. With apparatus constructed in accordance with the invention, the amount of backlash which exists between the threaded parts 22 and 23 is immaterial. The reason backlash is immaterial is that the indicator 32 does not react directly to manipulation of the adjusting means 21. Instead, the indicator 32 responds only to actual relative movement between the parts 2 and 1 due to the reaction between the base 1 and the arm 2 of the parts 56 and 51. Accordingly, deflection of the indicator pointer 38 cannot take place until there actually has been some movement of the arm 2 relative to the base 1 and such relative movement cannot take place until all backlash or play in the adjusting mechanism 21 has been taken up. Thus, any change in reading of the indicator 32 represents an actual relative movement between the base 1 and the arm 2.

The arrangement of the parts of the apparatus shown in the drawings is such as to mount a tool for left hand feed. The apparatus is capable of mounting a tool for right hand feed, however, merely by replacing the tool holder 64 with one having a surface sloping in the opposite direction of the surface 65 and by changing the positions of the indicator 32 and the actuating plate 51. The position of the indicator 32 may be changed by withdrawing the guide 37 and the plunger 37a from the passage 44 and extending them through the passage 45, the cover plate 47 having been turned end for end. The position of the actuating plate 51 may be changed by removing the mounting pin 52, sliding the plate 51 and its bearing assembly 53 from one end of the pin 52 to the other, and reinserting the pin 52 in the opening 54, thereby locating the lever arm 55 in a position to bear against the indicator plunger 37a when the latter extends through the passage 45.

Various accessories may be included with apparatus constructed in accordance with the invention and some of the more important accessories are shown in FIGURES 7 and 8. The tool supporting apparatus shown in FIGURES 7 and 8 is the same as has been described heretofore, with certain modifications hereinafter pointed out.

When adjusting the tool arm 2 relatively to the base 1, it would be possible to make an adjustment of such magnitude as to cause the indicator pointer 38 to swing from its zero position through an arc greater than 180°. Should an inadvertent or unnecessary adjustment of the tool thereafter be made by someone other than the original operator, either the original or other operator would, by observing the indicator pointer 38, notice that it is on either the "+" or the "−" side of the scale and would make an adjustment accordingly. When the needle 38 has moved more than 180°, however, an adjustment made with reference only to the plus or minus signs could be in error. Accordingly, it is preferred that limit means designated generally by the reference character 75 be provided for limiting relative movement between the arm 2 and the base 1 to an amount such as to prevent swinging of the indicator pointer through 180° from its zero position. The limit means comprises a shear pin 76 anchored in an opening formed in the base 1 and extending through an opening 77 formed in the arm 2. The opening 77 should be larger than the diameter of the pin 76 and the difference in diameters should be such that when the pin is centered in the opening 77, movement of the arm 2 in either direction cannot exceed an amount greater than would be recorded by about a 180° sweep of the pointer arm 38.

Another difficulty that sometimes is encountered with apparatus of the general class to which the invention relates is the inadvertent adjustment of a tool during periods of idleness of a machine. Under such conditions, an operator beginning a production run has no way of knowing what the proper setting of the indicator means should be and, consequently, has to make a trial run in order to position the tool properly to a workpiece. In order to minimize difficulties of this kind, apparatus constructed in accordance with the invention may include a dial plate 78 secured to the arm 2 by suitable means such as screws 79 and having a circular scale 80 adapted to surround the scale of the indicator 32 so as to permit the needle 38 also to be used in conjunction with the scale 80. At one edge of the dial plate 78 is a reference line 81 which is adapted to be read in conjunction with an indicia disc or scale 82 mounted on the arm 2 by means of a bolt 83 so as to be capable of being locked in any one of a number of adjusted positions relative to the line 81.

In using the dial plate 78 and its associated mechanism, an operator, having once adjusted the tool so that it is located in a desired position relatively to a workpiece, may observe the position of the pointer 38 on the scale 80 and adjust the scale 82 relatively to the reference line 81 so that the two indicia correspond. There after, and without regard to subsequent adjustments of the bezel 34, an operator may determine the proper setting of the tool arm 2 by comparing the reading obtained from the outer scale 80 and the indicia plate 82. Thus, the scale 80 and the indicia disc 82 function as a memory device to record the proper setting of a tool.

It has been pointed out hereinbefore that a tool holder may be adjusted longitudinally of the arm 2 by manipulation of the adjusting screws 73. In many cases it may be desirable to know exactly how much adjustment is imparted to the tool holder and for this purpose an indicator 85 similar in all respects to the indicator 32 may be mounted on the arm 2 by means of a screw 86 in a location such as to permit its plunger 87 to bear against the rear of the tool holder. Manipulation of the adjusting screws will effect movement of the pointer 88 so as to indicate directly the amount of movement imparted to a tool.

If desired, a dial plate 89 having a scale 90 may be mounted on a block 72a, which replaces the anchor block 72, by means of a screw 91 and dowel pins 92, the arrangement being such that the scale 90 surrounds the scale of the indicator 85. The plate 89 may be cut away as at 92a to permit an indicia disc or scale 93 to be mounted on the block 71, the scale 93 being capable of being fixed in any one of a number of adjusted positions relative to a reference line 94 by means of a lock screw 95. The scales 90 and 93 function as a memory device exactly like that previously described to record the longitudinal adjustment of a tool.

The disclosed embodiments are representative of presently preferred forms of the invention but are intended to be illustrative rather than definitive thereof. The invention is defined in the claims.

We claim:

1. Adjustable tool supporting apparatus comprising a base member; a tool supporting member; means mounting said supporting member at a selected distance between its ends on said base member for rotation relative thereto about an axis in either of two opposite directions; manipulatable adjusting means reacting between said base member and said supporting member operable to effect relative rotation of said members in either of said directions about said axis; and indicating means independent of said adjusting means reacting between said base member and said supporting member at a predetermined distance from said axis for indicating the amount of relative movement between said members in either of said directions.

2. Apparatus as set forth in claim 1 including actuating crank means movably mounted on one of said members and engaging said indicating means; and a fixed part on the other of said members in engagement with said crank means to impart movement thereto in response to relative rotation of said members.

3. Apparatus as set forth in claim 2 wherein said crank means is mounted on said supporting member and said fixed part is mounted on said base member.

4. Adjustable tool supporting apparatus comprising a base member; a tool supporting member; means mounting said supporting member on said base member for rotation relative thereto about an axis in either of two different directions; manipulatable adjusting means reacting between said members for effecting relative rotation thereof in either direction about said axis; indicating means independent of said adjusting means mounted on one of said members operable to indicate relative movement in either direction of said members; and actuating means reacting between both of said members and said indicating means for operating the latter in response to relative movement of said members in either of said directions.

5. Apparatus as set forth in claim 4 wherein said actuating means comprises a first part rotatably mounted on said one of said members and engaging said indicating means; and a second part fixed on the other of said members and engaging said first part to impart rotation thereto upon relative rotation of said members.

6. Apparatus as set forth in claim 4 wherein said actuating means is located a predetermined distance away from said axis.

7. Apparatus as set forth in claim 4 including stop means reacting between said members for limiting relative rotation therebetween in either of said directions.

8. Adjustable tool supporting apparatus comprising a base member; a tool supporting member; means mounting said supporting member at a selected distance between its ends on said base member for rotation relative thereto about an axis in either of two opposite directions; manipulatable adjusting means reacting between said base member and said supporting member operable to effect relative rotation of said members in either of said directions about said axis; indicating means independent of said adjusting means reacting between said base member and said supporting member at a predetermined distance from said axis for indicating the amount of relative movement between said members in either of said directions; a tool holder adapted to support a tool; means mounting said tool holder on said support member for back and forth movements along said support member; and indicator means reacting between said support member and said tool holder for indicating the extent of movement of said tool holder relative to said support member.

References Cited in the file of this patent

UNITED STATES PATENTS

| | | |
|---|---|---|
| 1,027,549 | Kronert | May 28, 1912 |
| 1,230,032 | Riddle | June 12, 1917 |
| 1,807,999 | McMurhy | June 2, 1931 |
| 2,170,246 | Kleiner | Aug. 22, 1939 |
| 2,349,503 | Konba | May 23, 1944 |
| 2,360,567 | Lloyd | Oct. 17, 1944 |
| 2,451,684 | Megel | Oct. 19, 1948 |
| 2,462,226 | Rosenow | Feb. 22, 1949 |
| 2,581,980 | Suber | Jan. 8, 1952 |
| 2,619,863 | Buchler | Dec. 2, 1952 |

FOREIGN PATENTS

| | | |
|---|---|---|
| 119,530 | Switzerland | Dec. 7, 1925 |